(12) United States Patent
Lee

(10) Patent No.: US 6,632,022 B2
(45) Date of Patent: Oct. 14, 2003

(54) COUPLING STRUCTURE FOR BEARING AND BUSHING

(76) Inventor: Bill Lee, No. 148, Tai-Ho Rd., Chu-Pai City, Hsin-Chu Hsien (TW)

( * ) Notice: Subject to any disclaimer, the term of this patent is extended or adjusted under 35 U.S.C. 154(b) by 0 days.

(21) Appl. No.: 09/934,831

(22) Filed: Aug. 23, 2001

(65) Prior Publication Data

US 2003/0039418 A1 Feb. 27, 2003

(51) Int. Cl.[7] ............................................. F16C 21/00
(52) U.S. Cl. ........................................................ 384/126
(58) Field of Search ................................. 384/126, 127, 384/279, 903

(56) References Cited

U.S. PATENT DOCUMENTS

| | | | | |
|---|---|---|---|---|
| 1,675,624 A | * | 7/1928 | Taylor | 74/424 |
| 2,573,735 A | * | 11/1951 | Sanford et al. | 295/44 |
| 3,708,215 A | * | 1/1973 | Wilcock et al. | 384/126 |
| 4,861,172 A | * | 8/1989 | Annast et al. | 384/126 |
| 4,879,567 A | * | 11/1989 | Lawrence | 384/126 |

\* cited by examiner

*Primary Examiner*—Jack Lavinder
*Assistant Examiner*—Thomas Williams
(74) *Attorney, Agent, or Firm*—Bacon & Thomas, PLLC

(57) ABSTRACT

A coupling structure for bearing and bushing. The structure includes a ball bearing, a washer and an oil-retained bearing housed sequentially in a housing chamber of a bushing. The housing chamber has one end formed a lip opening for anchoring the bearings and the washer such that the bearings and the washer are allowed to attain precise positioning and concentricity, with reduced vibration, and prevent lubrication oil of the oil-retained bearing from flowing to the ball bearing to effectively minimize noise and vibration.

6 Claims, 2 Drawing Sheets

COUPLING STRUCTURE FOR BEARING AND BUSHING

FIELD OF THE INVENTION

The present invention relates to a coupling structure for bearing and bushing and particularly a coupling structure that allows a bearing, a washer and an oil-retained bearing to have accurate positioning and concentricity, and reduced vibration and prevent lubrication oil from flowing from the oil-retained bearing to the ball bearing to enhance lubrication effect, and effectively prevent noise and vibration.

BACKGROUND OF THE INVENTION

The rapid technology innovations and developments have raised great awareness among people on the requirements of lower energy consumption and miniature products. To meet these requirements, demands for enhancing machining precision and matching accuracy have also increased, particularly on miniature high speed rotational elements.

Nowadays, operation stability of miniature brushless motors has become increasingly important. In recent years, a lot coupling products for bearing and bushing have been developed and introduced. For instance, to dispose a ball bearing and an oil-retained bearing in a linear barrel type bushing is one of such products. It has the advantages of a ball bearing and an oil-retained bearing, and is easy and simple to assemble, hence is well accepted. However there are still problems in assembly and utilization, notably:

1. The two bearings are difficult to position precisely in a linear barrel type bushing.
2. Concentricity and verticality of the two bearings also are difficult to attain. To achieve this requirement needs very high precise machining, and will result in higher production costs.
3. During operation, lubrication oil in the oil-retained bearing will flow into the ball bearing and mixes with the lubrication oil of the ball bearing. Blending these two different types of lubrication oils will destroy the atomic bond and downgrade the lubrication effect, and generate noise and vibration.

SUMMARY OF THE INVENTION

The primary object of the invention is to resolve the foregoing disadvantages. The invention aims to provide a simple structure to allow a ball bearing, a washer and an oil-retained bearing disposed sequentially into a housing chamber of a bushing to achieve precise positioning and concentricity between the bearings and bushing, and also to reduce vibration, and prevent lubrication oil of the oil-retained bearing from flowing to the ball bearing thereby to enhance lubrication effect, and prevent noise and vibration from taking place.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
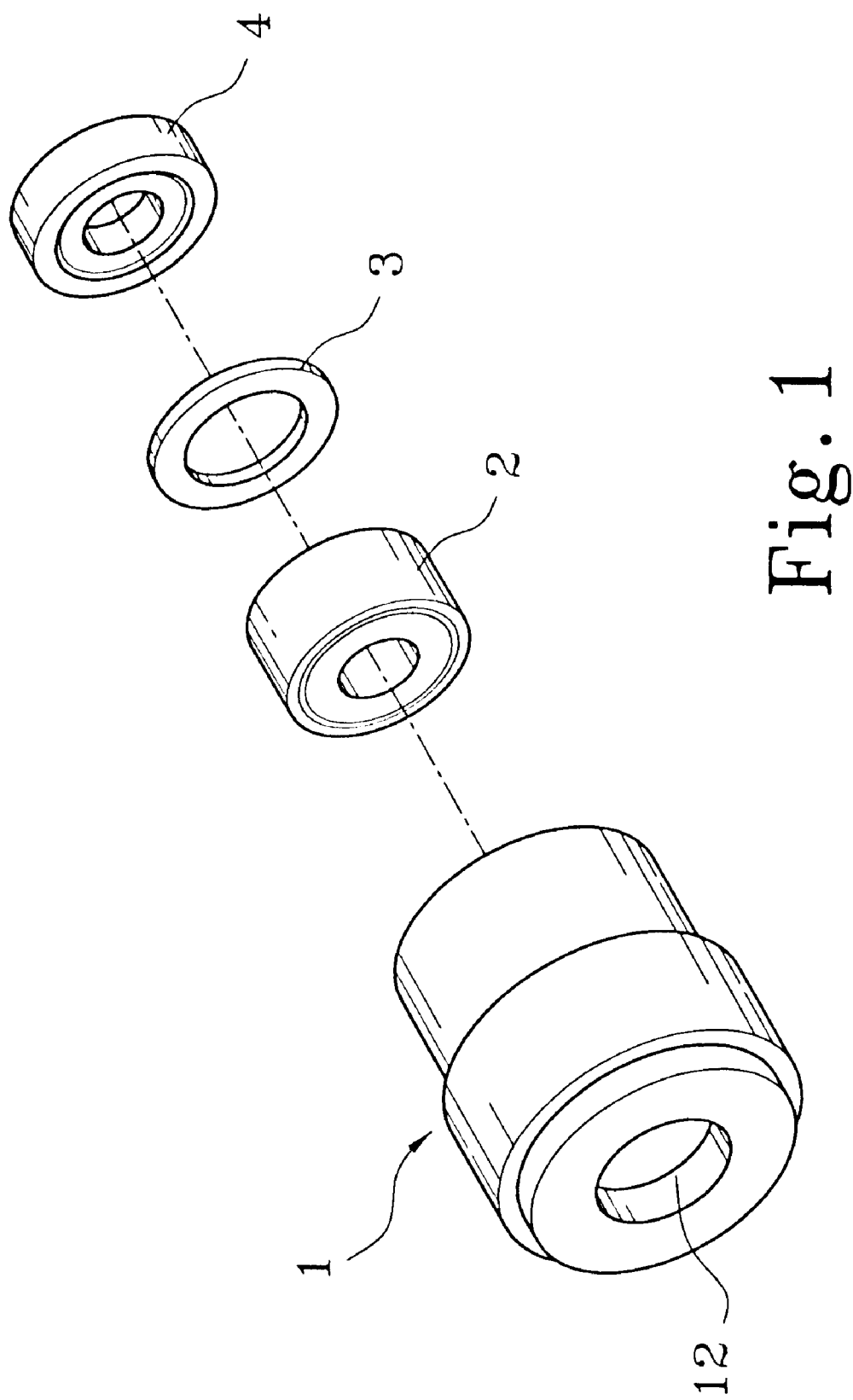
FIG. 1 is an exploded view of the invention.
Figure 2:
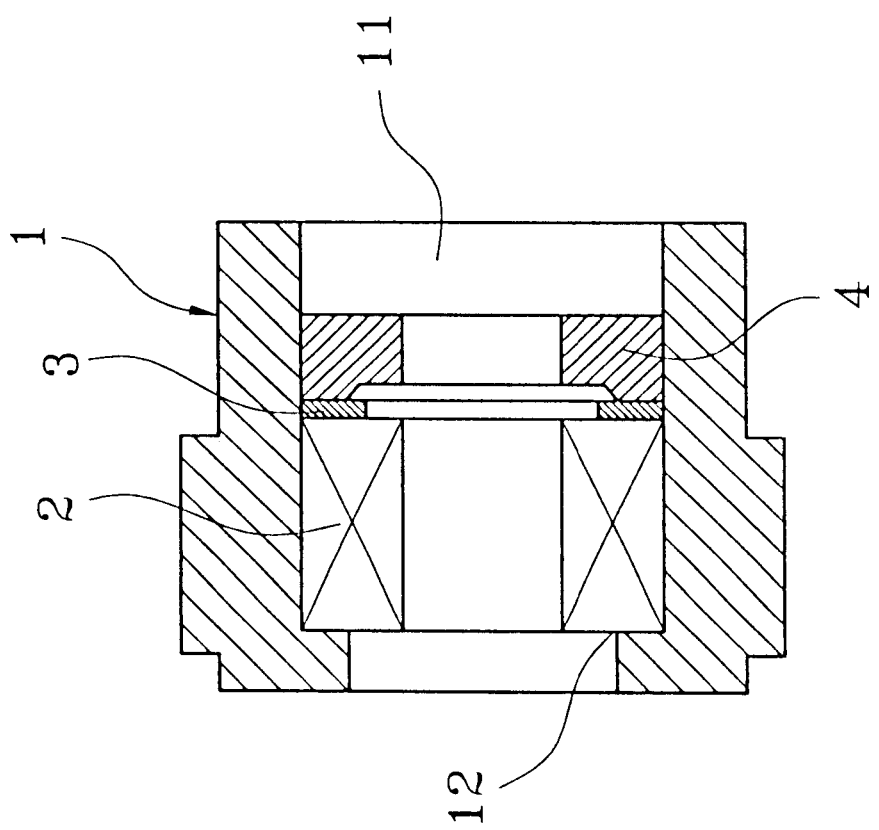
FIG. 2 is a sectional view of the invention.

Referring to FIGS. 1 and 2, the coupling structure of the invention includes a ball bearing 2, a washer 3 and an oil-retained bearing 4 housed sequentially in a housing chamber 11 of a bushing 1.

The housing chamber 11 has one end formed a lip opening 12 to anchor the ball bearing 2 and the washer 3, and to allow the side surfaces of the ball bearing 2, the washer 3 and the oil-retained bearing 4 having closed contact with the interior wall of the housing chamber 11 thereby to achieve precise positioning and concentricity in the bushing 1.

The ball bearing 2 includes lubrication oil that is different from that contained in the oil-retained bearing 4. The washer 3 (may be a disk type washer or a spring washer), in addition to damping vibration, can also isolate and prevent the lubrication oil of the oil-retained bearing 4 from flowing to the ball bearing 2 and contaminate the lubrication oil of the ball bearing 2, which will degrade the lubrication oils.

As shown in FIGS. 1 and 2, the ball bearing 2, washer 3, oil-retained bearing 4 and the bushing 1 each includes a through bore; and the through bores are concentric. The through bore of the bushing 1 is the lip opening 12, the diameter of which is smaller than the outer diameter of the ball bearing 2.

The coupling structure of the invention thus allows the ball bearing, the washer and the oil-retained bearing housed in the bushing with precise positioning and concentricity. It also can damp vibration and prevent lubrication oil of the oil-retained bearing from flowing to the ball bearing, thus effectively prevents noise and vibration from taking place.

What is claimed is:

1. A coupling structure for a bearing and bushing comprising:
   a bushing having a housing chamber;
   a ball bearing housed inside the housing chamber, the ball bearing containing a first lubricant;
   a washer positioned adjacent to the ball bearing inside the housing chamber;
   an oil-retained bearing containing a second lubricant, the oil-retained bearing positioned adjacent to the washer in the housing chamber, and the washer is positioned between the ball bearing and the oil-retained bearing; and
   the housing chamber having one end thereof comprising a lip opening adapted for anchoring the ball bearing and the washer such that the ball bearing and the oil-retained bearing and the washer are allowed to attain precise positioning and concentricity with respect to one another, and prevent the second lubrication oil contained in the oil-retained bearing from mixing with the first lubrication oil of the ball bearing, thereby minimizing noise and vibration during operation.

2. The coupling structure as claimed in claim 1, wherein the washer comprises a disk type washer.

3. The coupling structure as claimed in claim 1, wherein the washer comprises a spring washer.

4. A coupling structure for a bearing and bushing comprising:
   a bushing having a housing chamber;
   a ball bearing having an outer diameter and housed inside the housing chamber, the ball bearing having a first through bore, the ball bearing containing a first lubricant;
   a washer having a second through bore, the washer positioned adjacent to the ball bearing inside the housing chamber;
   an oil-retained bearing having a third through bore, the oil-retained bearing containing a second lubricant and positioned adjacent to the washer in the housing chamber, and the washer is positioned between the ball bearing and the oil-retained bearing; and the housing chamber having one end thereof comprising a lip opening having a diameter smaller than the outer diameter of the ball bearing, the lip opening adapted for anchoring the ball bearing and the washer such that the ball bearing and the oil-retained bearing and the washer are allowed to attain precise positioning and concentricity with respect to the through bores thereof, and prevent the second lubrication oil contained in the oil-retained bearing from mixing with the first lubrication oil of the ball bearing, thereby minimizing noise and vibration during operation.

5. The coupling structure as claimed in claim 4, wherein the washer comprises a disk type washer.

6. The coupling structure as claimed in claim 4, wherein the washer comprises a spring washer.

* * * * *